April 14, 1953 J. F. HOUDEK, JR 2,635,130

SUBASSEMBLY FOR TELEPHONE SETS

Original Filed July 13, 1945 2 SHEETS—SHEET 1

INVENTOR:
JOSEPH F. HOUDEK JR.

BY John J. Bellamy
ATTORNEY

April 14, 1953 J. F. HOUDEK, JR 2,635,130

SUBASSEMBLY FOR TELEPHONE SETS

Original Filed July 13, 1945 2 SHEETS—SHEET 2

INVENTOR:
JOSEPH F. HOUDEK JR.
BY John I. Bellamy
ATTORNEY

Patented Apr. 14, 1953

2,635,130

UNITED STATES PATENT OFFICE 2,635,130

SUBASSEMBLY FOR TELEPHONE SETS

Joseph F. Houdek, Jr., Elmhurst, Ill., assignor, by mesne assignments, to Kellogg Switchboard and Supply Company, a corporation of Delaware Original application July 13, 1945, Serial No. 604,856. Divided and this application August 8, 1950, Serial No. 178,269

1 Claim. (Cl. 173—328)

This application is a division of my application Serial No. 604,856, filed July 13, 1945, now Patent No. 2,548,723, issued April 10, 1951.

This invention relates to sub-assemblies for telephone sets of the type installed at subscriber sub-stations and commonly called telephone subsets.

Its general object is to provide an improved form of sub-assembly, for telephone subsets so arranged that compact assembly of elements within the subsets can be effected.

A more specific object is to construct an efficient, space saving sub-assembly capable of being received within the limited confines of the housing of a cradle type subset.

It has been chosen to illustrate the invention as embodied in a sub-assembly including a block for housing subset instruments (such as coils and condensers), and a terminal block (or base block) in association with which the instrument block is mounted. The instrument block includes a housing portion arranged to lie adjacent to the base block in abutting relation with an edge thereof, and is provided with a laterally extending portion overhanging the base block. The laterally extending portion projects from the upper part of the instrument block and is provided with depending prongs which cooperate with socket terminals in the base block so as to secure the parts together both mechanically and electrically.

A feature of the invention is that by reason of the novel overhanging mounting of the instrument block, it abuts the terminal block on at least two sides to reliably support the instrument block in rigid relation against vibrational and jarring forces normally incident to handling of the subset.

Another feature is that a sub-assembly constructed in accordance with this invention permits a compact association of elements with a minimum of hinderance to their accessibility.

Other objects and features will become apparent as the description progresses.

Reference is made to the co-pending application of Joseph F. Houdek Jr., for telephone sets, Serial No. 665,042 filed April 26, 1946, now Patent No. 2,524,350, issued October 3, 1950, directed to the circuit arrangement for the present telephone set.

*The general arrangement*

Figure 1:
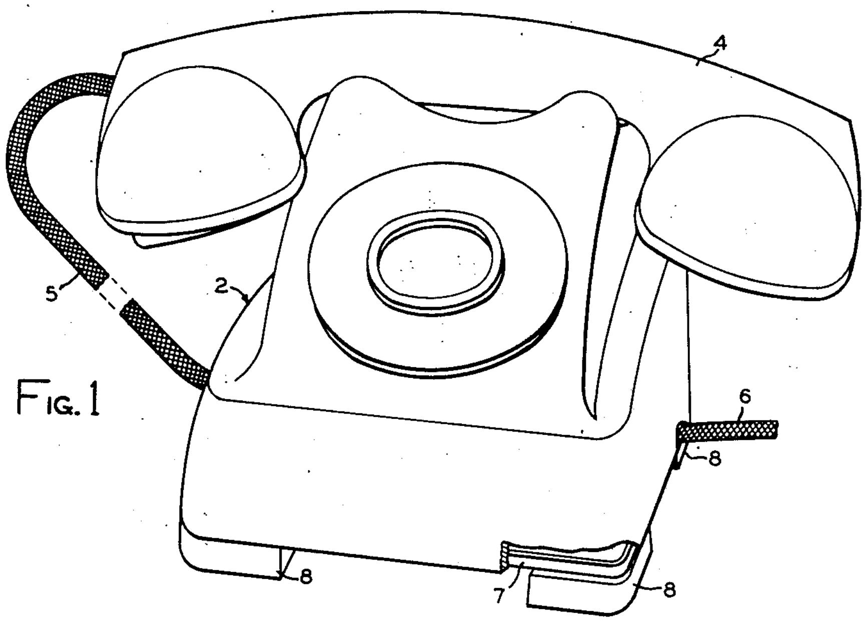
Fig. 1 is a perspective view, generally from the front, of a telephone desk set incorporating the invention.

As shown in Fig. 1, the illustrated telephone set is supported on feet 8, attached to base plate 7. It includes the base assembly shown in Fig. 2 and a housing 2 providing a cradle within which handset 4 normally rests. Cord 5 contains three conductors interconnecting handset 4 with the base assembly. Line cord 6 contains four conductors for making all required external connections to the set.

Figure 2:
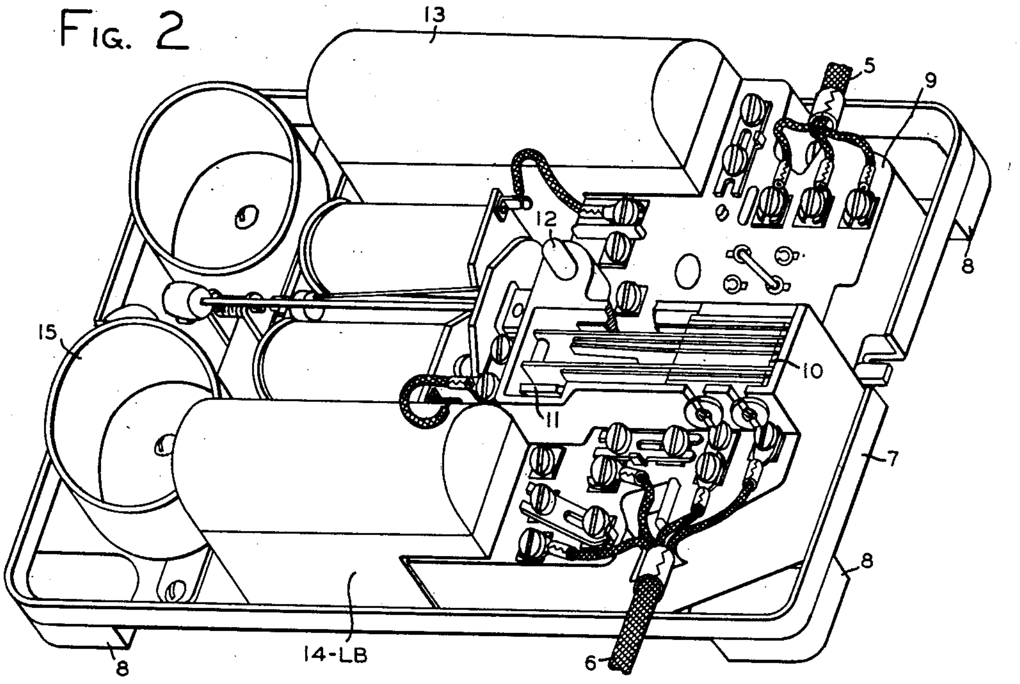
Fig. 2 is a view of the base assembly incorporated in the telephone set of Fig. 1, as seen from a point above the right rear corner thereof.

The base assembly, shown in Fig. 2 includes base plate 7 and the parts attached thereto. These attached parts include base block 9, which carries all necessary attachment terminals for the entire set; condenser block 13; coil block 14-LB and ringer 15. Hookswitch 10 together with its actuating parts 11 and 12, is received within a suitable opening in base block 9.

*The base block*

Figures 3, 4, 5:
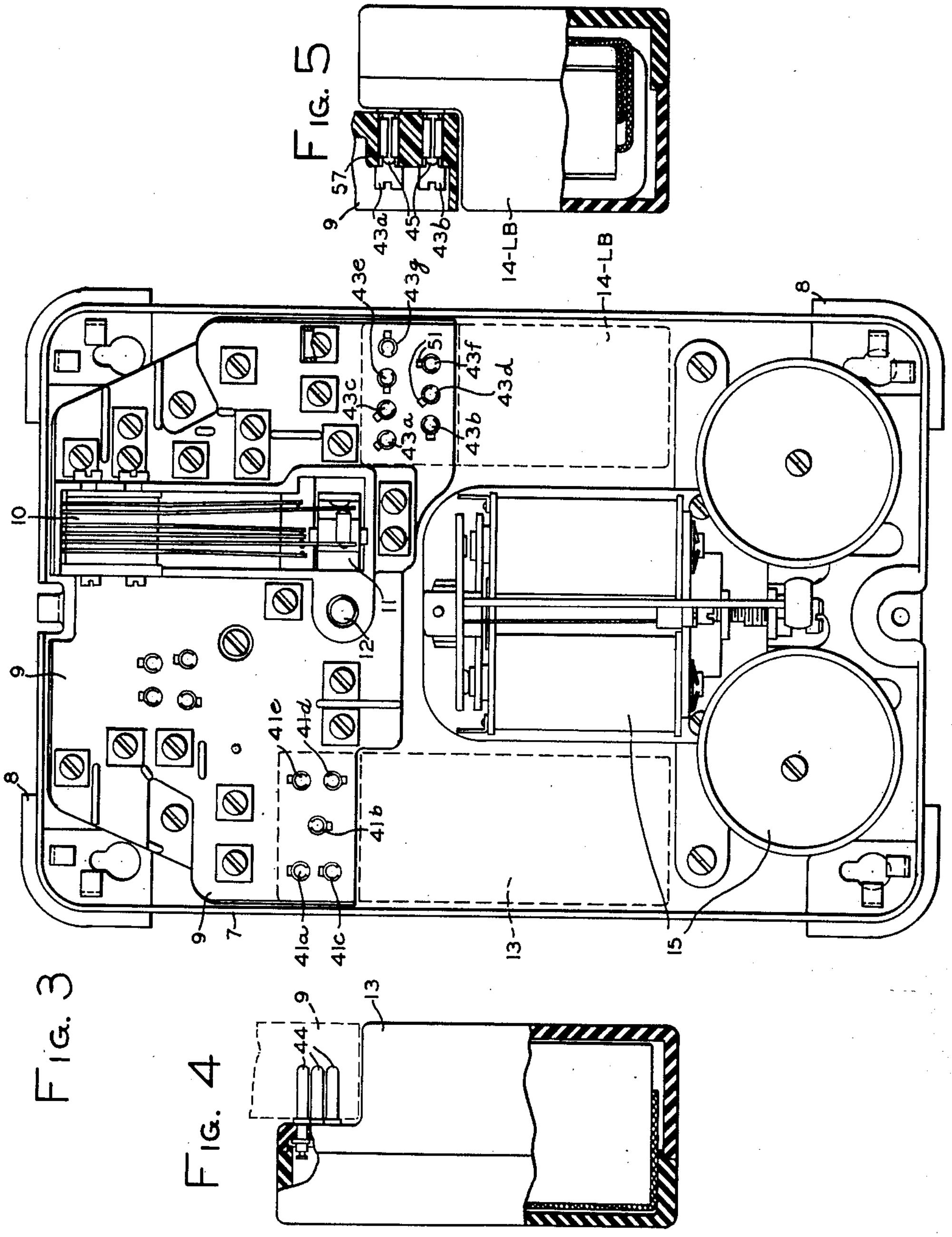
Fig. 3 is a plan view of the base assembly shown in Fig. 2 but with certain parts removed.
Fig. 4 is a profile view of the condenser block 13 of Fig. 2 showing in dotted outline how it is associated with the base block and showing parts of the condenser block broken away to reveal its construction.
Fig. 5 is a profile view of induction coil block 14-LB of Fig. 2 showing in cross-section a portion of the base block 9 with which it is associated and showing parts of the coil block broken away to reveal its internal construction.

Referring now to Fig. 3, it will be noted that condenser block 13 and coil block 14-LB of Fig. 2 have been removed from the assembly and shown in side view in the associated Figs. 4 and 5 which also show in dotted lines and in cross section respectively, portions of base block 9 with which they are associated. The respective assembled positions occupied by these parts are shown in dotted outline in Fig. 3. The pin socket terminals through which parts 13 and 14-LB attach, mechanically and electrically, to the base block 9 are also exposed to view in Figs. 3 and 5. These pin-socket terminals include the five terminals 41*a* to 41*e* for condenser block 13 and the seven terminals 43*a* to 43*g* for coil block 14-LB.

The several screw terminals and pin-socket terminals mounted in base block 9, together with downwardly extending terminals of hookswitch 10, are interconnected within the hollow back portion of the base block. The interconnection is accomplished by preformed conducting strips received within the prongs of the bifurcate terminal ends as explained in detail in the parent case, now Patent No. 2,548,723.

*Pin-socket terminals*

Suitable openings in base block 9 are provided for each of the pin-socket terminal groups 41 and 43. The wall of the base block is thickened at regions such as at 57 (Fig. 5) by formations which may be described as dependent bosses. The extent of boss 57 is shown in cross-section in Fig. 5. This thickening of the wall permits a satisfactory support length for the pin-socket terminals not required for other terminals on the assembly.

All of the pin socket terminals may be of the same construction. Pin-socket terminals 43*a* and 43*b* of Figs. 2 and 3 are shown in Fig. 5 as seen from the side. Both of these terminals have been rotated slightly in Fig. 5 from the position in which they are shown in Fig. 3 in order to facilitate drawing and to promote clarity. Each terminal has the general form of a split tube which lies within its opening in base block 9.

The top end of the tube is provided with a laterally extending positioning tab 51 formed integrally therewith. In assembled position, tab 51 lies in a positioning recess formed adjacent to the top end of the opening through part 9, thereby fixing the position of the pin-socket terminal rotationally to conform to a predetermined direction.

Preferably, the opening through which the pin-socket terminals pass are substantially larger than the pin socket terminal so as to permit expansion of the pin-socket terminal when it grippingly receives a pin terminal, and also to permit substantial lateral displacement of any pin-socket terminal to accommodate variations in the relative locations of several pins which are to cooperate with a group of the pin-socket terminals.

*Condenser and coil blocks*

Upon referring to Figs. 4 and 5 in connection with Figs. 2 and 3, it will be observed that the condenser and coil blocks 13 and 14–LB are of similar construction except that condenser block 13 is somewhat longer because of the increased volume of the enclosed condensers as compared to the induction coil. Each block is in the form of a two-piece container, the lower section of which is provided with pin terminals shown at 44 for condenser block 13 and at 45 for coil block 14–LB. The lower portion of the block is provided with an overhanging shelf through which the pin terminals 44 or 45 protrude. The protruding ends of these terminals cooperate with pin-socket terminals 41 or 43 as the case may be. Condenser block 13 has five terminals for cooperation respectively with pin-socket terminals *a* to *e* in group 41, while coil block 14–LB has seven pin terminals for cooperation respectively with pin sockets *a* to *g* of group 43. The inner end of each pin 44 or 45 is formed as shown for one such pin 44 in Fig. 4 to receive one or more internal terminal conductors. Preferably, after the condenser assembly, or the induction coil, as the case may be, has been placed in the lower section of the concerned one of the two blocks, and has had its terminal leads connected to the inner end of the terminal pins, the block is filled with an insulating compound surrounding the condenser or coil, following which the upper portion of the block is assembled and is secured in place as by cement. The finished block (13 or 14–LB) is thus sealed against the entrance of moisture into the electrical apparatus contained therein. As shown best in Fig. 2, observed in conjunction with Figs. 4 and 5, each of the blocks 13 and 14–LB lies partly opposite the forward edge of base block 9 and partly overhangs the base block. Either such block is placed in assembled position shown, with its pins (44 or 45) entering the pin sockets (41 or 43 as the case may be). It will be observed that the left-hand portion of base block 9 is narrower from front to rear than the remainder thereof so as to accommodate the somewhat greater length of condenser block 13.

The pin terminals (44 or 45) of either of the blocks under discussion are rather widely spaced to conform with the spacing of the concerned pin-socket terminals 41 or 43 (Fig. 3). As a result each of the two blocks is held reliably in place by the gripping action of the pin socket on its terminal pins, rendering additional securing means unnecessary. A special feature of this arrangement is that when the base assembly is incorporated in the complete set, the housing 2 (Fig. 1) serves to retain blocks 13 and 14–LB in place in the event that they should tend to be jarred out of position during shipment in an upside-down condition, as may occur. This feature results from the disclosed location of blocks 13 and 14–LB parallel to the longer sides of the base plate 7 and below the abutments formed in the housing 2 where the enlarged base portion thereof gives way to the narrower pedestal portion which terminates in the handset cradle.

I claim:

A subassembly for a telephone substation set including a terminal block carrying a number of terminals including a first group mounted adjacent one edge thereof, an instrument block including an instrument-containing portion which, in the mounted position thereof, abuts one side of the terminal block adjacent to the first group of terminals, the instrument block including a terminal portion which overhangs the terminal block above the first terminal group, and a second group of terminals extending through said overhanging portion aligned with, and arranged to be brought respectively into sliding contact with the terminals of said first group when the instrument block is brought to a position above the terminal group and moved downwardly into the said mounted position thereof.

JOSEPH F. HOUDEK, Jr.

References Cited in the file of this patent

UNITED STATES PATENTS

| Number | Name | Date |
|---|---|---|
| 1,835,109 | Ayres | Dec. 8, 1931 |
| 1,967,021 | Gary | July 17, 1934 |
| 2,268,619 | Reid | Jan. 6, 1942 |
| 2,314,225 | Leece | Mar. 16, 1943 |
| 2,362,797 | Bokovoy | Nov. 14, 1944 |
| 2,482,214 | Rogie | Sept. 20, 1949 |